United States Patent [19]
Musil

[11] Patent Number: 4,815,587
[45] Date of Patent: Mar. 28, 1989

[54] FASTENER FOR HARVESTER BELTS

[75] Inventor: Edward C. Musil, Lyons, Ill.

[73] Assignee: Flexible Steel Lacing Company, Downers Grove, Ill.

[21] Appl. No.: 864,972

[22] Filed: May 20, 1986

Related U.S. Application Data

[63] Continuation-in-part of Ser. No. 694,929, Jan. 24, 1985.

[51] Int. Cl.$^4$ ............................................. B65G 19/00
[52] U.S. Cl. .................................... 198/728; 198/844; 24/31 B; 24/33 B
[58] Field of Search ................... 24/31 B, 31 H, 33 B, 24/33 P, 33 R, 38; 198/728, 731, 698, 699, 844, 846, 848, 849; 474/257, 255, 256, 253; 403/4, 388, 408.1

[56] References Cited

U.S. PATENT DOCUMENTS

| | | | |
|---|---|---|---|
| 538,443 | 4/1895 | Ferguson | 198/844 X |
| 803,716 | 11/1905 | Sarle | 24/33 B |
| 1,479,915 | 1/1924 | Hulse | 24/33 B |
| 2,906,395 | 9/1959 | Greer | 198/844 X |
| 3,638,281 | 2/1972 | Francois | 24/31 B |
| 3,742,557 | 7/1973 | Francois | 24/33 B |
| 4,023,671 | 5/1977 | Kramer | 24/31 B X |
| 4,625,369 | 12/1986 | Musil | 24/33 B |

FOREIGN PATENT DOCUMENTS

| | | | |
|---|---|---|---|
| 3309329 | 4/1984 | Fed. Rep. of Germany | 198/728 |
| 3246528 | 6/1984 | Fed. Rep. of Germany | 198/728 |
| 142638 | 7/1980 | German Democratic Rep. | 198/844 |
| 980654 | 12/1982 | U.S.S.R. | 198/728 |

OTHER PUBLICATIONS

Broekema catalogue sheet.
Noffsinger catalogue sheet.

Primary Examiner—Leslie J. Paperner
Assistant Examiner—Cheryl L. Gastineau
Attorney, Agent, or Firm—Fitch, Even, Tabin & Flannery

[57] ABSTRACT

A pair of harvester belts have ends joined to form an endless loop by hinged belt fasteners of identical shape. Parallel rods span the endless belts and one of the parallel rods has ends inserted into interleaved loops on adjacent belt fasteners to form a hinge pin connection. In one embodiment, only the belt fastener has only a single plate secured to one side of the belt by threaded fasteners. In another embodiment, the belt fastener has both upper and lower plates with the upper plate having a channel to receive a parallel rod end and fasteners secure the parallel rods, the upper plate, the belt and the lower plate.

4 Claims, 5 Drawing Sheets

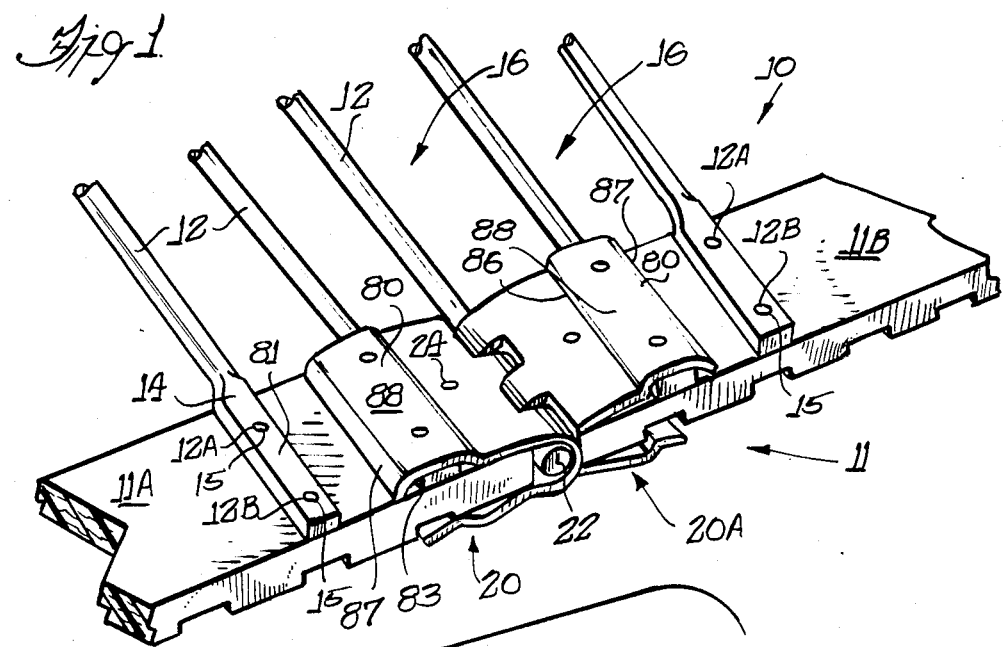
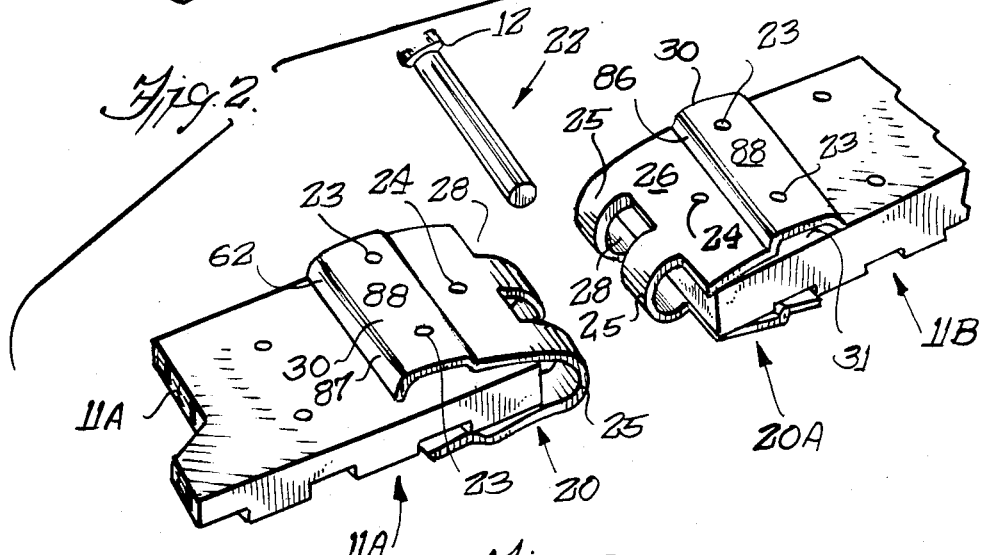
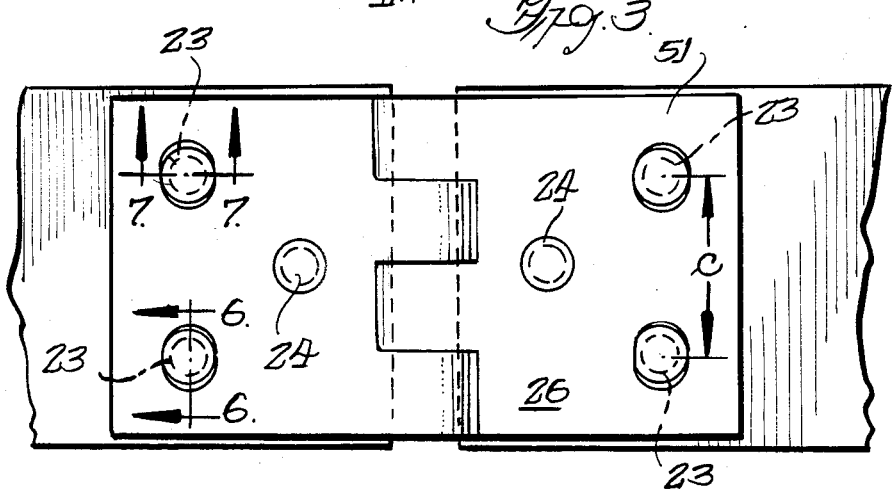

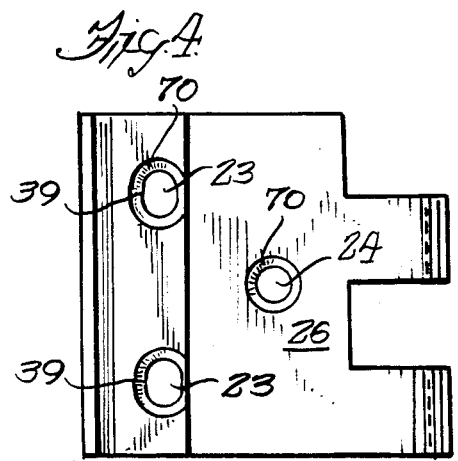
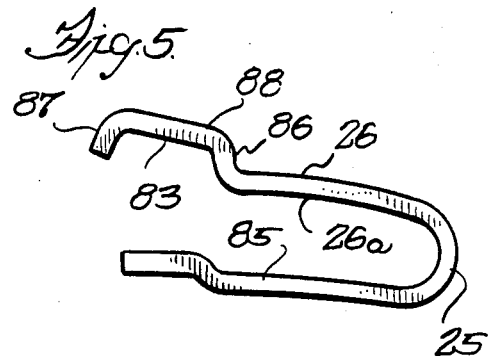
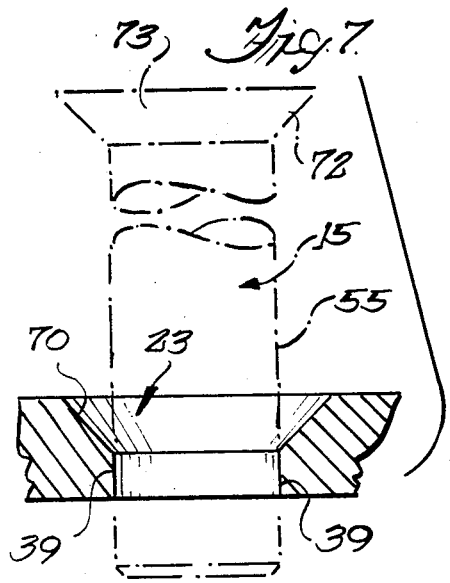
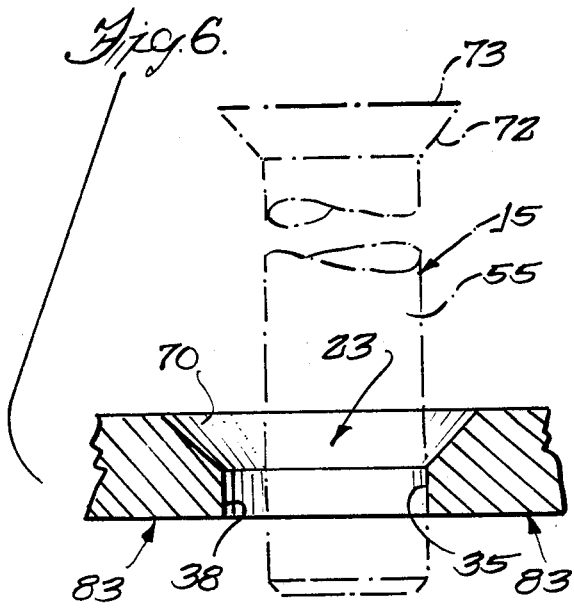
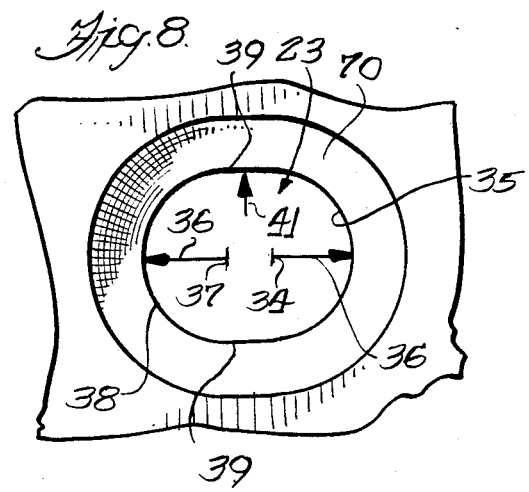
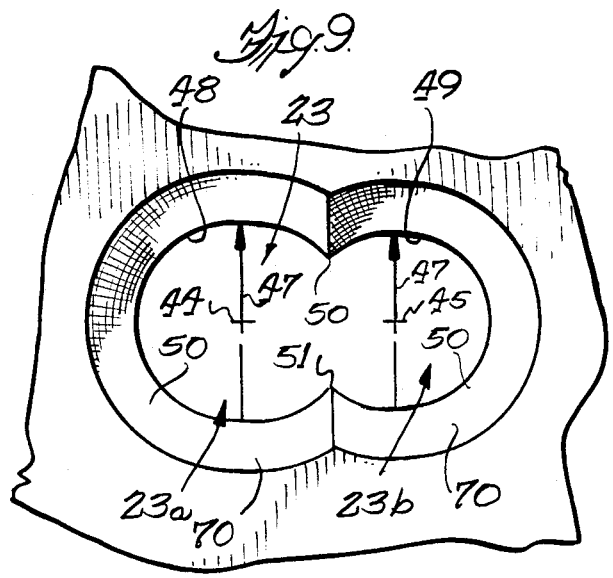

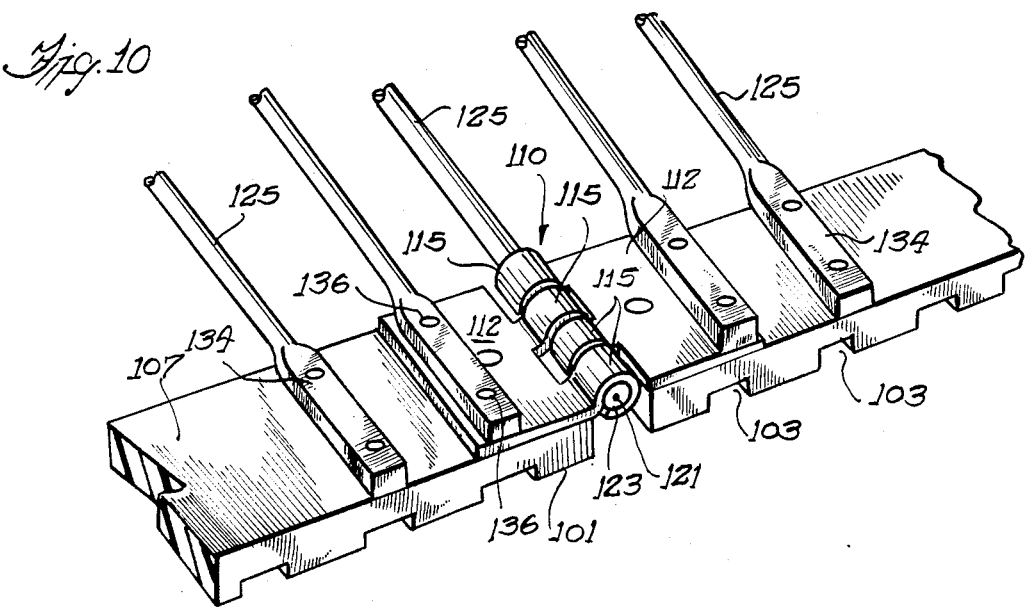
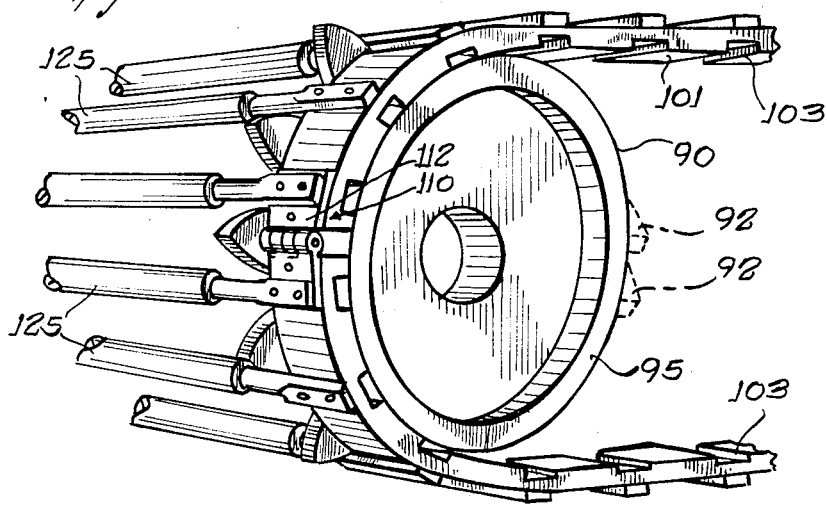
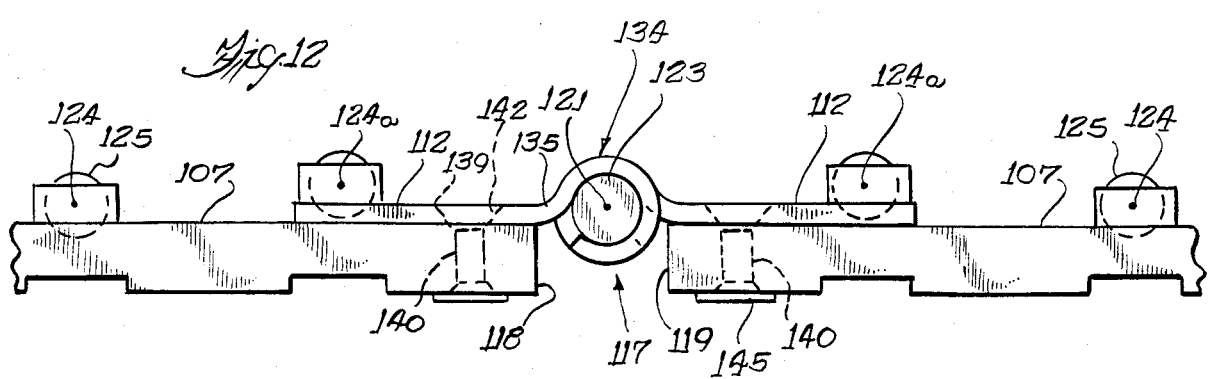

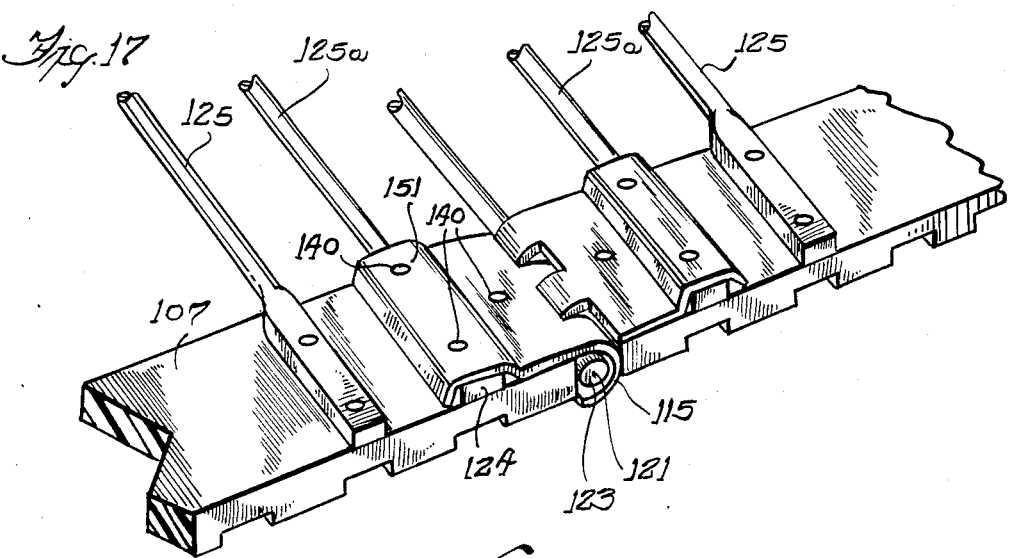
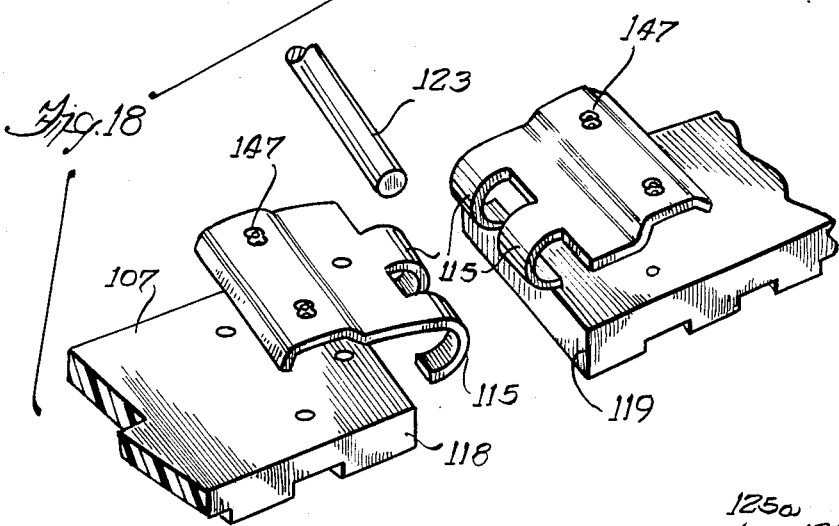
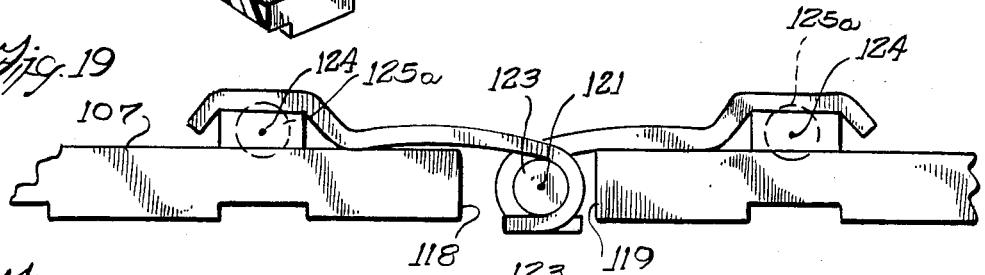
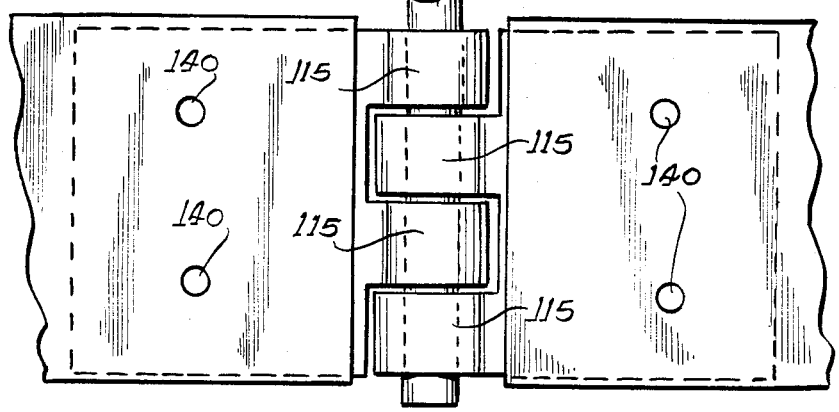

FASTENER FOR HARVESTER BELTS

BACKGROUND OF THE INVENTION

This application is a Continuation-in-Part application of copending application Ser. No. 694,929 filed Jan. 24, 1985 for "Fastener For Harvester Belts", now abandoned.

This invention relates to belted chain fasteners and to rod conveyors having endless belts joined together with such fasteners.

The present invention is particularly directed to, although it is not limited to, rod belt conveyors typically used on farm machinery and, for that reason are hereinafter called "harvester conveyors" which are mainly used to convey and transport and often to size food products such as tomatoes, onions, carrots, potatoes and other vegetables. The belts also have other uses such as conveying and sizing rocks and may be used in mines as well as above ground. The typical harvester belt conveyor has on each side thereof a pair of spaced traction rubber belts of 50 mm or 60 mm in width which are spaced and spanned by laterally extending rods, each of which has opposite flattened ends fastened to the traction belts. The spacing between the parallel rods defines an opening which is used (or may be used) for sizing to allow products of a lesser size to pass through the parallel rods while the larger products remain on top of the rods. In other instances, the rods are used for the conveying vines or material which is not intended to be sized. These traction belts are joined to be endless and typically have belted chain fasteners joining opposite ends of the traction belt. A hinge pin formed through the interleave loops or knuckles of the belt fasteners provides a completed hinge joining to the belt ends to form an endless traction belt. Steel belted chain fasteners may have a channel into which is projected the flattened end of a rod which is fastened thereto by bolt or rivet fasteners. The belted fasteners include a male belt fastener with a single hinge loop that projects into an opening between a pair of hinge loops on the female belt fastener. Both the male and female belt fasteners have upper and lower plates on opposite sides of the belt. The hinge may either be formed with a separate hinge pin or a rod itself may be used as a hinge pin.

A particular problem with such prior art belted chain fasteners is that they require a huge inventory of parts to take account of the various pitch sizes, two different belt widths, and because the prior belted chain fasteners are both male and female in construction. The pitch size is related to the spacing distance between adjacent rods and the hole spacing locations in the fasteners are positioned accordingly for each of the different pitch spacings for the rods. For instance, the available pitches for a fastener may be 32, 36, 40, 42, 45 or 50 mm. In addition to these different pitches, the fasteners are offered with a different cross spacing of holes which is often 20 or 24 mm and in some instances is offered in spacings of 30 and 32 mm.

The hinge loops of the conventional male and female belt fasteners projected downwardly into the gap between the joined belt ends and the axes of the parallel rod having the hinge pin ends thereon was disposed below a plane defined by the axes of the other parallel rods which are fastened directly to the top or outer sides of the belt. These conventional belt fasteners have a bottom plate which projects into the notched groove in the underside of the belt such that a drive cog of a conveyor drive sprocket will not fit precisely therein; and this causes the belt to be stretched and strained at the belt fastener as the belt fastener travels. Also, when the belt is driven by a friction roller drum rather than a cogged sprocket, the added thickness of the underlying plate of the belt fastener causes the belt to be stretched and strained at the location of the hinge belt fastener as the belt and hinge fasteners pass around the friction drive drum.

Accordingly, an object of the present invention is to provide a new and improved harvester belt and belted chain fasteners therefor.

Another and more specific object of the invention is to reduce substantially the inventory of belted chain fasteners.

A still further object of the invention is to provide such fasteners that are less expensive and easier to manufacture.

These and other objects and advantages of the invention will become apparent from the following detailed description and the accompanying drawings in which:

BRIEF DESCRIPTION OF THE DRAWINGS

FIG. 1 is a fragmentary perspective view of a harvester belt constructed in accordance with the preferred embodiment of the fastener;

FIG. 2 illustrates the hinge loops to be joined together by a hinge pin;

FIG. 3 illustrates a pair of belted chain fasteners joined together;

FIG. 4 is a plan view of a belted chain fastener;

FIG. 5 is a side elevational view of a belted chain fastener of FIG. 4;

FIG. 6 is an enlarged cross sectional view taken substantially along the line 6—6 in FIG. 3.

FIG. 7 is a view taken substantially along the lines 7—7 of FIG. 3;

FIG. 8 is a plan view at the aperture shown in FIG. 6; and

FIG. 9 is a plan view of an aperture constructed in accordance with another embodiment of the invention.

FIG. 10 is a view similar to FIG. 1 of a belt fastener constructed in accordance with a further embodiment of the invention.

FIG. 11 illustrates the belt fastener and conveyor of FIG. 10 disposed about a drive roller.

FIG. 12 is a side elevational view of the belt fastener and conveyer of FIG. 10.

FIG. 17 illustrates a belt fastener in accordance with a still further embodiment of the invention.

FIG. 18 is an exploded view of the belt fastener of FIG. 17.

FIG. 19 is a side elevational view of the belt fastener of FIG. 17.

FIG. 20 is a plan view of the belt fastener of FIG. 19.

DETAILED DESCRIPTION OF THE INVENTION

Figure 13:
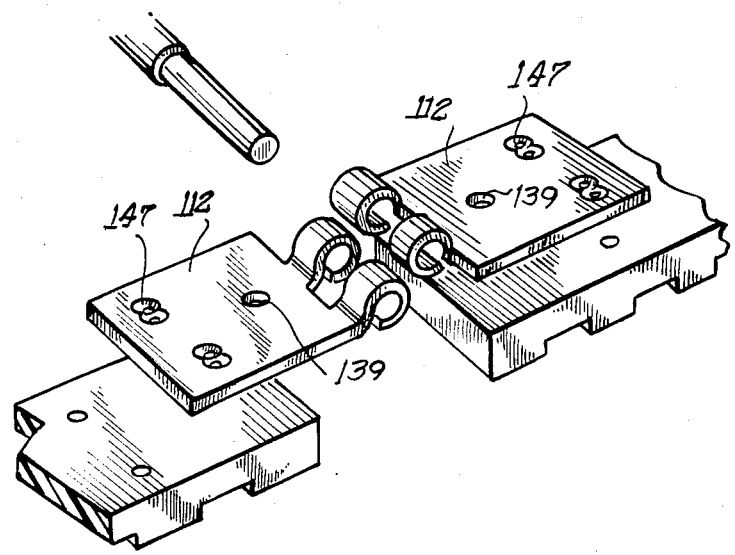
FIG. 13 is an exploded view of the belt fastener of FIG. 10.

As shown in the drawings for the purpose of illustration, the invention is embodied in a belted chain harvester belt 10 which includes a pair of opposite parallel traction belts 11, only one of which is shown in FIG. 1. Usually, the width of the traction belt is either 50 or 60 mm. Manifestly, other belt widths may be used. The other left hand belt (not shown in FIG. 1) would be identical in construction to the belt shown in FIG. 1. The traction belt 11 is typically made of rubber or elastomeric material with an interior woven fabric reinforcement. Spanning the opposed parallel belts 11 are a series of parallel rods 12 each of which has a pair of opposite flattened ends 14 fastened by rivet or bolt fastener 15 to the belts. The rods 12 are spaced at predetermined spacing, i.e. at a predetermined pitch distance, so as to define gauging spaces 16 therebetween through which may drop articles of less than a predetermined size.

The traction belts 11 are made endless by means of a pair of belted chain fasteners 20 and 20A which are joined together by a harvester rod 12 having a hinge pin end 22 as best seen in FIGS. 1 and 2. In some instances, a separate hinge pin is used without having any rod attached thereto. The illustrated belt 11 has first and second belted ends 11A and 11B which are joined together by the hinge pin end 22 to provide an articulating hinge and a continuous belt.

Conventional chain belted fasteners are provided as male and female fasteners which are mated together to form the hinge. The male fastener had a single projecting belt loop projecting into a space between a pair of belt loops on the female belt fastener. Additionally, as above described, as many as six pitch distances and as many as four different cross spacing distances are used. Typically, the traction belt 11 comes in two widths which are a 50 mm and a 60 mm width and the conventional belted chain fasteners are provided in two nominal 50 and 60 mm widths, one for each belt width. Because of the large number of pitch distances supplied and because the belt fasteners were male and female, the inventory of chain belted fasteners is quite large. Also, conventional belted chain fasteners are made for each different cross spacing distance C (FIG. 3) which is tehe transverse or lateral spacing between the centers of the apertures 23 and which is the transverse spacing between holes 12A and 12B in a flattened rod end 14.

In accordance with the present invention the inventory of belted chain fasteners may be reduced very substantially by using identical belted chain fasteners 20 and 20A, i.e. the belt fasteners are not male and female of different shapes, which automatically reduces the inventory by one-half. More specifically, each of the belted chain fasteners 20 and 20A have identical hinge loops 25 which when turned to face each other may be interleaved with each loop inserted into a space 28 which is sized to receive the loop 25 of the other belted chain fastener.

In accordance with another aspect of the invention, the inventory of belted chain fasteners may be reduced by the use of enlarged or oblong holes 23 which are sized to take a plurality of cross spacings, e.g. a cross spacing of 20 mm between holes 12A and 12B in a first rod 12 or 24 mm between such holes in another rod 14. More specifically, as can be seen clearly in FIGS. 4 and 8, the aperture 23 is elongated, or oblong in the lateral direction (which is in the vertical direction in FIG. 4) such that it may receive at least two different cross spacings. Referring now to FIG. 8, it will be seen that the aperture 23 has a first center 34 for an arcuate wall section 35 curved at a radius 36. Likewise, a second left hand center 37 is the axis for an arcuate wall section 38 which has the same length of radius. The centers 34 and 37 are spaced, for example, at 2 mm to accommodate a 20 mm cross spacing and a 24 mm cross spacing. Straight line wall sections 39 join the respective arcuate wall sections 35 and 36 to complete the elongated or oblong aperture 23.

In accordance with the present invention, the inventory of belted chain fasteners may be further reduced by using the same belt chain fastener of a nominal 50 mm width on belts of both 50 mm and 60 mm width. There is a substantial difference in cross spacing distance between apertures 23 on a 50 mm and a 60 mm belt. In accordance with the embodiment shown in FIG. 9, a very substantial spacing is provided to allow fasteners 15 to be used in a first hole portion 23a or section hole portion 23b. These first and second hole portions have a sharp cusp or neck 50 between two arcuate wall sections 48 and 49 as shown in FIG. 9. More specifically, the aperture shown in FIG. 9 has a first arcuate wall section 48 (FIG. 9) and a second arcuate wall section 49 which are joined at a common neck 50. The arcuate wall section 48 has a center or axis 44 and the arcuate wall section 49 has an axis or center 45 and both of the wall sections 48 and 49 are curved at an identical length of radius 47. The centers 44 and 45 are spaced to provide one-half of the cross space variation as the other hole 23 is also elongated with its centers spaced to provide the other one-half of the cross spacing variation. Because of the substantial distance between the first and second hole portions 23a and 23b, it has been found to be possible to use a single belted chain fastener of approximately 50 mm in width for both a 50 mm and 60 mm width belt. This allows elimination of the 60 mm fastener width inventory. Thus, a very substantial inventory reduction is achieved.

The fastener 15, whether a bolt or a rivet has a cylindrical shank 55, FIG. 7, which when positioned in aperture 23 abuts the straight wall sections 39 (FIG. 7) and either one of the arcuate wall sections 35 or 38 (FIG. 6). While some spacing will exist between one of the arcuate wall sections 35 and 38 and the fastener shank, there is no such substantial spacing in the orthogonal direction between straight line wall sections 39. Thus, as best seen in FIG. 6, the shank 55 is abutting one arcuate wall section 35 and is spaced from the other arcuate wall section 38.

The aperture 24 is not oblong but is circular and is sized to the diameter of the cylindrical shank 55 of the fastener to be received therein.

Additionally, it has been found that the upstanding ends on the fasteners may damage the food materials being sized and transported and that there is often a large amount of wear of the fastener heads because of their projecting upwardly. In the prior art belted chain fasteners, the fastener heads project substantially upwardly above the top surfaces of belted chain fasteners and may damage tomatoes or other objects being transported.

In accordance with the present invention, substantial countersinks or bevels 70 are formed about the apertures 23 and 24 in the belted chain fasteners. As best seen in FIGS. 6–9, each of the countersinks 70 has downwardly and inwardly tapering walls against which will be abutted inclined sides 72 on the heads 73 of the fastener bolt or rivet so that the head is lowered substantially so as not to hit the fruit or the like which not only may cause damage. This lowering of the fastener head also results in less abrading of the fastener heads.

Herein, the upper plates of the fasteners 20 are formed with an inverted channel portion or member 80 which is sized to receive therein the flattened end 14 of a rod 12. The illustrated rod ends 14 have generally flat upper and lower surfaces 81 with the lower surface abutting the belt and the upper surface abutting the inner surface 83 of the channel member 80. Herein, each of the channel members has a pair of opposed side flanges 86 and 87 (FIG. 5), and a top web 88 extending between the parallel flanges 86 and 87. In the usual countersinking operation, the metal is pushed down and leaves a flash or protrusion at the lower surface below the hole. Herein, the undersurface 83 of the channel member as well as undersurface 26a below flat plate 26 is kept flat and planar as shown in FIGS. 5 and 7. The lower plate 85 (FIG. 5) of the fastener also has identical sets of holes 23 and 24 which are countersunk also with flat interior surfaces free of metal from the countersinking operation.

The present invention is particularly useful in being able to provide a single inventory of chain belted fasteners for use with either one of two different original equipment manufacturers who use slightly different cross spacing distances between their apertures in an apparent attempt to preclude the replacement of its chain belt fasteners by those of the other manufacturer.

The conventional harvester belt fastener (not shown) is carried by the belt about a drive pulley or sprocket 90 as best seen in FIG. 11 which may have a cog 92, which projects upwardly into the cog slot 103 which is a parallel slot formed in the underside 101 of the belt. The cog sprocket 90 serves as a timing sprocket because the cogs mesh in timed relationship to the belt travel. In other instances, the underside 101 of the belt merely is brought over a cylindrical friction drive pulley or sprocket which has a smooth drive surface 95 without any cogs for projecting into the slots 103.

The conventional fastener is like the illustrated fastener shown in FIG. 1, in that, it has a bottom plate 85 with a portion such as the portion 105 shown in FIG. 1 which projects upwardly into the slot 103. This provides additional thickness at the slots 103 located in the belt closest to the hinge pin 22. Thus, it can be understood that the lower plates 85 of the fastener shown in FIG. 1 add additional thickness to the belt when is brought about the drive roller or sprocket 90 (FIG. 11). That is, when the belt is disposed about the drive roller, whether it is a smooth cylindrical friction drive surface 95 or a cog driving drum with cogs 92, the additional thickness of the bottom plates 85 of the belt fasteners stretches the belt and strains the belt.

Additionally, the usual conventional belt fasteners (not shown) are like the embodiment shown in FIG. 1 in that the hinge pin 22 and the parallel rod 12 attached to the hinge pin 22 thereon is located downwardly in a plane below the other parallel rods which are fastened to the top surface 107 of the belt. Thus, the rod 12 carrying the hinge pin 22 is located below the other rods 12 in FIG. 1 and will be at a different diameter pitch circle than the other rods 12 when the belt fasteners are moving about the driving drum 90.

Also, it has been found that the belt harvester fastener, shown in FIG. 1, is relatively difficult to manufacture in that it has multiple bends in the top plate to form the inverted channel 80 and also in the bottom plate 85 to form the multiple curves and bends shown in the bottom plate 85. In accordance with the embodiment of the invention shown in FIGS. 10-14, harvester belt fasteners 110 may be formed with upper plates 112 only that is, without a lower plate which adds thickness to the belt when going around the drive rollers and which is expensive to bend and form. Additionally, the piece of metal used to form the belt fastener 110 may be smaller in size when it does not include a bottom plate 85 and this reduces the cost of the belt fastener. The belt fasteners shown in FIG. 10, 11 and 12 each have a pair of hinge loops 115 which are identical in shape so that the fasteners may be identical in shape. The hinge loops 115 have an arcuate extent of about 330°. The forming of each hinge belt fastener of the same shape eliminates the necessity of stocking in inventory both male and female belt fasteners as with the conventional harvester belt fasteners.

Additionally it is preferred that the hinge loops 115 be located upwardly of the gap 117 (FIG. 10) between opposed belt ends 118 and 119, as best seen in FIG. 12, so that the central longitudinal axis 121 of the hinge pin 123 is located in a plane substantially in alignment with the axis 124 for each of the rods 125 which are fastened directly to the top surface 107 of the belt and which extend parallel across the respective first and second conveyor belts. Thus, it is preferred that the hinge pins 123 be located to place the parallel rod 125 attached thereto in substantially the same plane as the other rods 125. Thus, the hinge pin 123 and its attached rod 125 travel in the same pitch circle about the driving pulley 90 as do the other rods 125.

Rather than having an inverted channel such as the channel 80 shown in the embodiment FIG. 1, it is preferred that the upper plates 112 of the fasteners 110 be generally planar and, if desired that they have grooves formed in the top surface thereof, to locate flat end 134 of the parallel rods therein. Herein, the rods 125 are attached to the top surfaces of the top plates 112 of the belt fasteners and their respective axes 124a will be raised slightly above the center line or axis 121 of the hinge pin end and also about the same distance above the axis 124 for the other rods ends 134 not attached to a belt fastener. Thus, the rods 125 are attached over the top plates in FIGS. 10-12 rather than under the top plates as shown in FIG. 1.

The hinge pins 123 are inserted into a series of aligned hinge loops 115 formed on each belt fastener. The hinge loops are formed with an arcuate curve portion 133 which extends from a curve juncture 135 at the plate about a generally circular configuration to end at an end wall 137 which is spaced by an air gap from the overhead arcuate portion 135. It has been found that the strength of the belt fasteners illustrated in FIGS. 10-14 is sufficiently strong that there is no need for the bottom plate or for the fastening of any such bottom plate to the underside of the belt ends for most applications.

In the embodiment of the invention shown in FIGS. 10-14, flattened ends of rods 125 are fastened to the plate 112 of the hinge fastener by rivets 136 (FIG. 10) which may either extend through the belt or merely through the underlying plate 112 and the flattened bar end.

Figure 14:
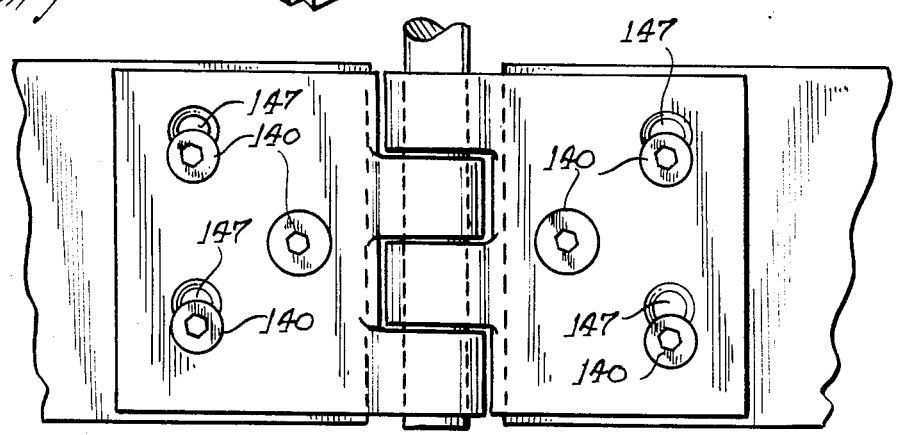
FIG. 14 is a plan view showing fasteners attaching the belt fasteners of FIG. 13 to the belt.

As best seen in FIGS. 13 and 14, the upper plates 112 of the belt fasteners shown in FIGS. 10–14 have the elongated or oblong apertures 147 similar to the apertures 23 shown in FIG. 9 for the belt fasteners described in connection with FIGS. 1–9 so that different belts or widths may be used with one size of belt fastener, as above described in connection with the embodiment of FIGS. 1–9. A third aperture 139 similar to the aperture 24 in FIG. 1 is formed in the top plate 112 to receive a rivet or threaded fastener 140. The fastener 140 has an upper rivet head 142 (FIG. 12) seated in the aperture 139 in the top plate with the opposite rivet head 145 being formed to abut the bottom side of a bottom surface of the conveyor belt.

Figure 15:
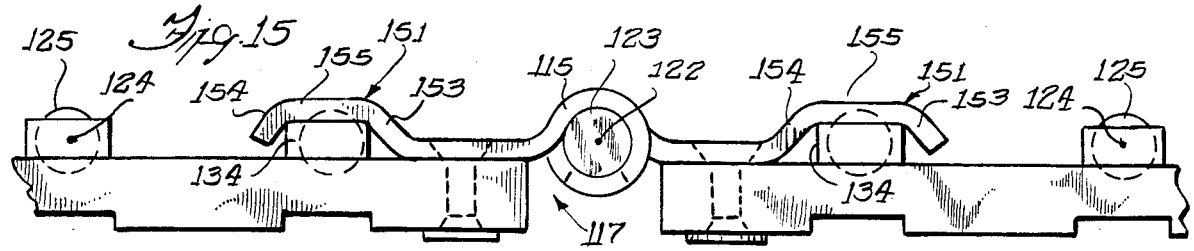
FIG. 15 is a side elevational view of still another embodiment of the invention.
Figure 16:
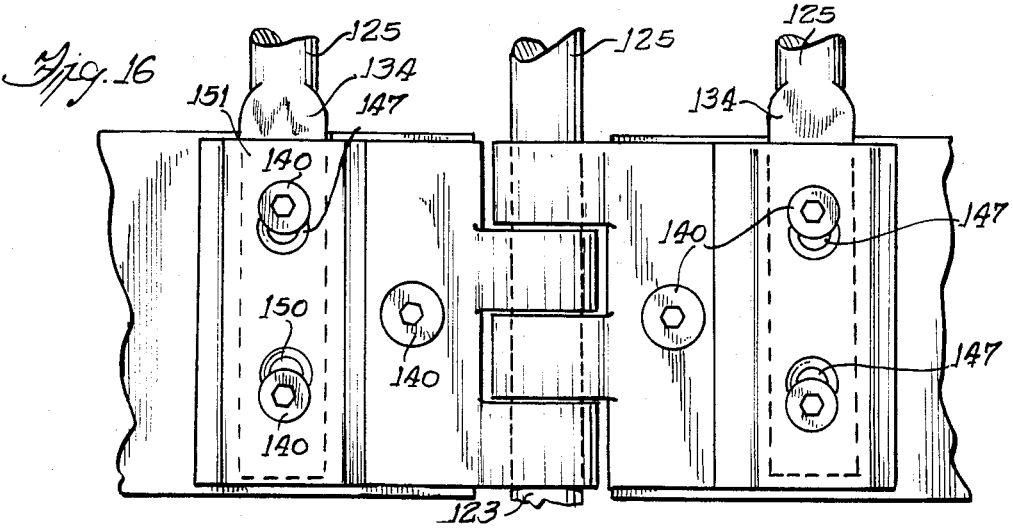
FIG. 16 is a plan view of the belt fastener of FIG. 15.

In accordance with the further embodiment of the invention shown in FIGS. 15–16, the belt fastener is formed without a bottom plate and has only a single top plate 112 which has an upper inverted channel 151 receiving therein the flattened rod end 134. That is, the rear portion of the upper plate 112 opposite the hinge loop 115 is also bent upwardly to form a loop or channel including upwardly inclined walls 153 and 154 joined at upper ends to a common web 155 so that the flattened end 134 of the rod 125 may be inserted between the channel portion of the plate 112 and the belt.

The inverted channel 151 extends over the flattened rod end 134 and is secured to the belts by fasteners. Herein, three fasteners 140 in the form of rivets secure each belt fastener to an end of the belt. The hinge loops 115 shown in FIGS. 15 and 16 are located as in the FIGS. 10–12 whereas in another embodiment shown in FIGS. 17–20, the hinge loops project down into the gap 117 between the belt ends 118 and 119 with a result that the axis 121 for the hinge pin 123 is lower than the plane defined by the longitudinal axes 124 of the other parallel rods 125, as clearly shown in FIG. 15. However, the rods 125a (FIG. 19) having flattened ends 134 in the inverted channels 151 are resting on the top surface 107 of the belt and are in the same plane as the remainder of the rods 125 spaced from the belt fasteners. In the embodiment of FIGS. 15 and 16, the hinge pin axis 122 is in the same plane as the axes 124 for the remainder of the parallel rods 125.

Preferably, the embodiments of the invention shown in FIGS. 10–16 have oblong holes 147 which can be used for fastening to holes 12A and 12B in the flattened ends of the rods of different spacings as above described in connection with FIGS. 1–9. FIG. 14 illustrates oblong holes 147 in the top plate 112 which is planar and which has the oblong holes to receive the fasteners 140 in either of two adjacent holes as above described in connection with FIGS. 8 and 9. Likewise, in FIG. 16, there is depicted a main central rivet or fastener 140 and a pair of fasteners 140 through the inverted channel 151.

From the foregoing, it will be seen that the present invention substantially diminishes the inventory of belt fasteners needed t be maintained by the use of a single fastener configuration rather than the male and female ends hereto used. Likewise, the inventory may be further reduced because oblong openings in the belt fasteners allow them to be attached to parallel rods having two different spacings between holes therein. The belt fasteners may be formed with or without a bottom plate. The hinge loop axis may be between the belt ends or it may be raised to the level of the axis of the other parallel rods fastened directly to the belts.

While several preferred embodiments have been shown and described, it will be understood that there is no intent to limit the invention by such disclosure but, rather, it is intended to cover all modifications and alternate constructions falling within the spirit and scope of the invention as defined in the appended claims.

What is claimed is:

1. In a conveyor belt apparatus for travel between and about toothed drive sprockets, the combination comprising:
   a first conveyor belt having ends positioned adjacent each other and spaced from each other by a predetermined gap,
   a second conveyor belt spaced from the first conveyor belt and positioned parallel to the first conveyor belt,
   a plurality of parallel rods spanning the parallel first and second conveyor belt and having opposite ends joined to the respective belts, said parallel rods having longitudinal axes which are spaced equidistantly from each other,
   said parallel rods moving about the drive sprocket with their longitudinal axes defining a pitch line,
   first and second hinge fasteners each of identical shape fastened to the respective belt ends of the first belt,
   each of said hinge fasteners having only a single plate fastened to one side of the first conveyor belt,
   each of said single plates lying in face-to-face engagement with and fastened to said one side of one of the belt ends,
   second fasteners extending through an end of the parallel rod, the hinge fastener and the belt and thereby securing each of the hinge fasteners to the first belt,
   hinge loops extending from each single plate and into the gap between adjacent belt ends and being interleaved with hinge loops of an adjacent hinge fastener,
   one of said rods having hinge ends inserted through the said interleaved hinge loops of said hinge fasteners secured to the belt ends for joining the loops together to form a hinged connection between the ends of the first belt, and
   said hinge ends being held by said hinge loops to position the axis of their associated rod at substantially the pitch line when traveling around the sprockets to reduce bumping of the conveyor belts as the hinge fasteners travel about the sprockets.

2. A conveyor belt in accordance with claim 1 in which the rod having the hinge ends is substantially in the plane of the other adjacent parallel rods.

3. A conveyor belt in accordance with claim 2 in which the single plate is substantially planar and in which one of said parallel rods is positioned on top of said single plate and fastened by said fasteners to the single plate.

4. A conveyor belt apparatus in accordance with claim 2 in which said single plate is formed with an inverted channel and one of said rods has an end disposed in said channel between the single plate and the belt.

* * * * *